US012521137B2

(12) United States Patent
Hasegawa

(10) Patent No.: US 12,521,137 B2
(45) Date of Patent: Jan. 13, 2026

(54) MEDICAL MANIPULATOR

(71) Applicant: OLYMPUS CORPORATION, Tokyo (JP)

(72) Inventor: Mitsuaki Hasegawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 743 days.

(21) Appl. No.: 17/899,753

(22) Filed: Aug. 31, 2022

(65) Prior Publication Data

US 2022/0409227 A1     Dec. 29, 2022

Related U.S. Application Data

(63) Continuation of application No. PCT/JP2020/010141, filed on Mar. 10, 2020.

(51) Int. Cl.
*A61B 17/29*     (2006.01)

(52) U.S. Cl.
CPC .. *A61B 17/2909* (2013.01); *A61B 2017/2901* (2013.01); *A61B 2017/2944* (2013.01)

(58) Field of Classification Search
CPC .......... A61B 17/2909; A61B 2017/291; A61B 17/29–17/295; A61B 2034/715;
(Continued)

(56) References Cited

U.S. PATENT DOCUMENTS 5,782,797 A    7/1998   Schweich, Jr. et al.
5,827,323 A   *   10/1998   Klieman ............ A61B 17/2909
                                                            606/205

(Continued)

FOREIGN PATENT DOCUMENTS

EP           2133035 A1    12/2009
EP           2160995 A1     3/2010
(Continued)

OTHER PUBLICATIONS

International Search Report dated Apr. 21, 2020 issued in PCT/JP2020/010140.

(Continued)

*Primary Examiner* — Kathleen S Holwerda
*Assistant Examiner* — Daniel Icet
(74) *Attorney, Agent, or Firm* — Scully, Scott, Murphy & Presser, P.C.

(57) ABSTRACT

A medical manipulator includes a flexible shaft, a distal-end portion, an operating unit with which the distal-end portion is operated, a wire transmitting a motive force of the unit to the distal-end portion, a coil formed from a material having a greater rigidity than the shaft and one end thereof being secured to the distal-end portion and the other end thereof being secured to the unit, and a tube having a greater bending rigidity than the coil. The unit includes a socket connected to the shaft, a ball relatively rotatable to the socket, and a handle with which the wire is pushed/pulled in the longitudinal direction, the coil is disposed at a position at which the coil covers an area surrounding the wire, and the tube is disposed at a position at which the tube covers an area surrounding the coil in spaces in the socket and the ball.

6 Claims, 12 Drawing Sheets

(58) Field of Classification Search
CPC ............... A61B 2017/003–2017/0034; A61B 2034/301; A61B 1/00; A61B 34/30–71
See application file for complete search history.

(56) References Cited

U.S. PATENT DOCUMENTS

| | | | |
|---|---|---|---|
| 6,666,854 B1* | 12/2003 | Lange | A61B 17/2909 606/1 |
| 8,282,543 B2 | 10/2012 | Ishiguro et al. | |
| 10,206,711 B1* | 2/2019 | Jadhav | A61B 17/3417 |
| 2002/0120252 A1 | 8/2002 | Brock et al. | |
| 2002/0128633 A1 | 9/2002 | Brock et al. | |
| 2002/0128661 A1 | 9/2002 | Brock et al. | |
| 2002/0128662 A1 | 9/2002 | Brock et al. | |
| 2002/0133173 A1 | 9/2002 | Brock et al. | |
| 2002/0138082 A1 | 9/2002 | Brock et al. | |
| 2003/0036748 A1 | 2/2003 | Cooper et al. | |
| 2003/0050649 A1 | 3/2003 | Brock et al. | |
| 2003/0135204 A1 | 7/2003 | Lee et al. | |
| 2004/0138700 A1 | 7/2004 | Cooper et al. | |
| 2005/0090809 A1 | 4/2005 | Cooper et al. | |
| 2005/0182298 A1 | 8/2005 | Ikeda et al. | |
| 2005/0216033 A1 | 9/2005 | Lee et al. | |
| 2005/0272975 A1 | 12/2005 | McWeeney et al. | |
| 2006/0030753 A1 | 2/2006 | Boutillette et al. | |
| 2006/0178556 A1 | 8/2006 | Hasser et al. | |
| 2006/0252993 A1 | 11/2006 | Freed et al. | |
| 2007/0021737 A1 | 1/2007 | Lee | |
| 2007/0276430 A1* | 11/2007 | Lee | A61B 1/00071 606/205 |
| 2008/0046000 A1* | 2/2008 | Lee | A61B 17/29 606/205 |
| 2008/0065116 A1 | 3/2008 | Lee et al. | |
| 2008/0177284 A1 | 7/2008 | Lee et al. | |
| 2008/0188868 A1 | 8/2008 | Weitzner et al. | |
| 2008/0188869 A1 | 8/2008 | Weitzner et al. | |
| 2008/0188871 A1 | 8/2008 | Smith et al. | |
| 2008/0188890 A1 | 8/2008 | Weitzner et al. | |
| 2008/0221391 A1 | 9/2008 | Weitzner et al. | |
| 2008/0243176 A1 | 10/2008 | Weitzner et al. | |
| 2009/0069842 A1* | 3/2009 | Lee | A61B 50/30 606/205 |
| 2009/0299344 A1 | 12/2009 | Lee et al. | |
| 2010/0022827 A1 | 1/2010 | Naito | |
| 2010/0030018 A1 | 2/2010 | Fortier et al. | |
| 2010/0063354 A1 | 3/2010 | Hashimoto et al. | |
| 2010/0168722 A1 | 7/2010 | Lee et al. | |
| 2010/0217072 A1 | 8/2010 | Kondoh et al. | |
| 2010/0249497 A1* | 9/2010 | Peine | A61B 17/2909 600/104 |
| 2011/0004225 A1* | 1/2011 | Choi | A61B 34/71 606/130 |
| 2011/0144656 A1 | 6/2011 | Lee et al. | |
| 2011/0163146 A1* | 7/2011 | Ortiz | A61B 34/72 227/175.1 |
| 2011/0184459 A1 | 7/2011 | Malkowski et al. | |
| 2011/0213300 A1 | 9/2011 | McWeeney et al. | |
| 2012/0065628 A1 | 3/2012 | Naito | |
| 2012/0190920 A1 | 7/2012 | Hasser et al. | |
| 2012/0209073 A1 | 8/2012 | McWeeney et al. | |
| 2012/0245567 A1 | 9/2012 | Lee et al. | |
| 2012/0302832 A1 | 11/2012 | Inada | |
| 2013/0012958 A1* | 1/2013 | Marczyk | A61B 17/2909 606/130 |
| 2013/0317522 A1* | 11/2013 | Nishizawa | A61B 17/3423 606/130 |
| 2014/0066706 A1 | 3/2014 | McWeeney et al. | |
| 2015/0164524 A1 | 6/2015 | Malkowski et al. | |
| 2015/0196364 A1* | 7/2015 | Perez, III | A61B 17/2909 606/130 |
| 2015/0238180 A1 | 8/2015 | Weitzner et al. | |
| 2015/0305797 A1* | 10/2015 | Hassoun | A61B 17/2909 606/208 |
| 2015/0313452 A1 | 11/2015 | Hasser et al. | |
| 2016/0287346 A1 | 10/2016 | Hyodo et al. | |
| 2016/0353979 A1 | 12/2016 | Hashizume et al. | |
| 2017/0105746 A1 | 4/2017 | O'Keefe | |
| 2017/0231475 A1 | 8/2017 | McWeeney et al. | |
| 2017/0311778 A1 | 11/2017 | Hasser et al. | |
| 2018/0078323 A1 | 3/2018 | Nakadate et al. | |
| 2018/0087975 A1* | 3/2018 | Ellis | G01K 11/20 |
| 2019/0142538 A1 | 5/2019 | Hyodo et al. | |
| 2019/0231466 A1 | 8/2019 | Weitzner et al. | |
| 2020/0069300 A1 | 3/2020 | Cruz et al. | |
| 2020/0107700 A1 | 4/2020 | Hasser et al. | |
| 2020/0170701 A1 | 6/2020 | O'Keefe | |
| 2020/0170738 A1 | 6/2020 | Hasegawa | |
| 2020/0305906 A1 | 10/2020 | O'Keefe | |
| 2020/0383740 A1 | 12/2020 | Hyodo et al. | |
| 2021/0145470 A1* | 5/2021 | Holsten | A61B 17/2909 |
| 2021/0153727 A1 | 5/2021 | Hasegawa | |
| 2021/0321861 A1 | 10/2021 | McWeeney et al. | |
| 2021/0386428 A1* | 12/2021 | Larsen | A61B 17/122 |
| 2022/0054208 A1 | 2/2022 | Cooper et al. | |
| 2022/0167836 A1* | 6/2022 | Thissen | A61B 1/00128 |
| 2022/0175409 A1 | 6/2022 | O'Keefe | |

FOREIGN PATENT DOCUMENTS

| | | |
|---|---|---|
| EP | 2529658 A1 | 12/2012 |
| EP | 3085324 A1 | 10/2016 |
| EP | 3284421 A1 | 2/2018 |
| JP | H08112352 A | 5/1996 |
| JP | 2000185013 A | 7/2000 |
| JP | 3712750 B2 | 11/2005 |
| JP | 2005305185 A | 11/2005 |
| JP | 3895755 B2 | 3/2007 |
| JP | 2007175502 A | 7/2007 |
| JP | 2010036039 A | 2/2010 |
| JP | 2010503457 A | 2/2010 |
| JP | 2010057919 A | 3/2010 |
| JP | 2011050748 A | 3/2011 |
| JP | 4989724 B2 | 8/2012 |
| JP | 2012525916 A | 10/2012 |
| JP | 2012245058 A | 12/2012 |
| JP | 2017512659 A | 5/2017 |
| JP | 2017164519 A | 9/2017 |
| JP | 2018534052 A | 11/2018 |
| JP | 2019034081 A | 3/2019 |
| JP | 2020018835 A | 2/2020 |
| WO | 2005094665 A2 | 10/2005 |
| WO | 2007120353 A2 | 10/2007 |
| WO | 2008020964 A2 | 2/2008 |
| WO | 2008033240 A2 | 3/2008 |
| WO | 2008070556 A1 | 6/2008 |
| WO | 2008126434 A1 | 10/2008 |
| WO | 2010129035 A2 | 11/2010 |
| WO | 2011145533 A1 | 11/2011 |
| WO | 2015087998 A1 | 6/2015 |
| WO | 2015093602 A1 | 6/2015 |
| WO | 2015126752 A1 | 8/2015 |
| WO | 2016166828 A1 | 10/2016 |
| WO | 2017068074 A1 | 4/2017 |
| WO | 2019030848 A1 | 2/2019 |
| WO | 2019039362 A1 | 2/2019 |
| WO | 2020017605 A1 | 1/2020 |
| WO | 2020039576 A1 | 2/2020 |

OTHER PUBLICATIONS

International Search Report dated Jun. 2, 2020 issued in PCT/JP2020/010141.
Related U.S. Appl. No. 17/899,778, filed Aug. 31, 2022.
US Office Action dated Jul. 16, 2025 received in U.S. Appl. No. 17/899,778.

* cited by examiner ated by an operator P; and various wires 7 and 9 that
MEDICAL MANIPULATOR This is a continuation of International Application PCT/JP2020/010141 which is hereby incorporated by reference herein in its entirety

TECHNICAL FIELD

The present invention relates to a medical manipulator.

BACKGROUND ART

In the related art, there is a known medical manipulator employing a system in which movable portions, such as a bending portion and a gripping portion, that are disposed at a distal end of an inserted portion are driven by means of wires (for example, see Patent Literature 1).

The medical manipulator described in Patent Literature 1 is a rigid surgical treatment tool, such as a laparoscopic forceps, and includes an operation portion having a ball joint structure. A bending portion thereof is bent by pulling a bending operation wire and a gripping portion thereof is opened/closed by pulling a grip opening/closing wire. The grip opening/closing wire is guided, by means of a torque coil, so as to pass through a certain route in a ball portion of the operation portion.

With the rigid surgical treatment tool, such as a laparoscopic forceps, it is possible to open/close the gripping portion with a relatively low force. In contrast, with a flexible long treatment tool that is suitable for a digestive tract, such as the large intestine, a large friction is generated between the grip opening/closing wire and the torque coil depending on the shape of the flexible portion; therefore, it is necessary to push/pull the grip opening/closing wire with a greater force to open/close the gripping portion, as compared with the case of laparoscopic forceps. In addition, with laparoscopic forceps, in general, the entire length of the treatment tool is short, and a thick wire is used as the grip opening/closing wire. In contrast, it is necessary to configure the torque coil that guides the grip opening/closing wire so as to be thin and flexible, because it is necessary to increase the flexibility of the inserted portion in order to insert the flexible long treatment tool into a body.

CITATION LIST

Patent Literature

{PTL 1} Japanese Unexamined Patent Application, Publication No. 2010-36039

SUMMARY OF INVENTION

An aspect of the present invention is a medical manipulator including: an elongated flexible inserted portion; an end effector disposed at a distal end of the inserted portion; an operation portion that is disposed at a proximal end of the inserted portion and with which the end effector is operated; a first wire in which one end thereof is secured to the end effector and that transmits a motive force of the operation portion to the end effector; a long coil that is formed from a material having a greater rigidity than the inserted portion and in which one end thereof in a longitudinal direction is secured to the end effector and the other end thereof in the longitudinal direction is secured to the operation portion; and a reinforcement tube having a greater bending rigidity than the long coil, wherein the operation portion includes a first spherical housing that is connected to the inserted portion, a second spherical housing that is relatively rotatable with respect to the first spherical housing centered on a prescribed center point, and an end-effector operating member that is secured to the other end of the first wire and with which the first wire is pushed/pulled in the longitudinal direction, the long coil is disposed at a position at which the long coil covers an area surrounding the first wire, and the reinforcement tube is disposed at a position at which the reinforcement tube covers an area surrounding the long coil in spaces in the first spherical housing and the second spherical housing.

DESCRIPTION OF EMBODIMENT

A medical manipulator according to an embodiment of the present invention will be described below with reference to the drawings.

Figure 1:
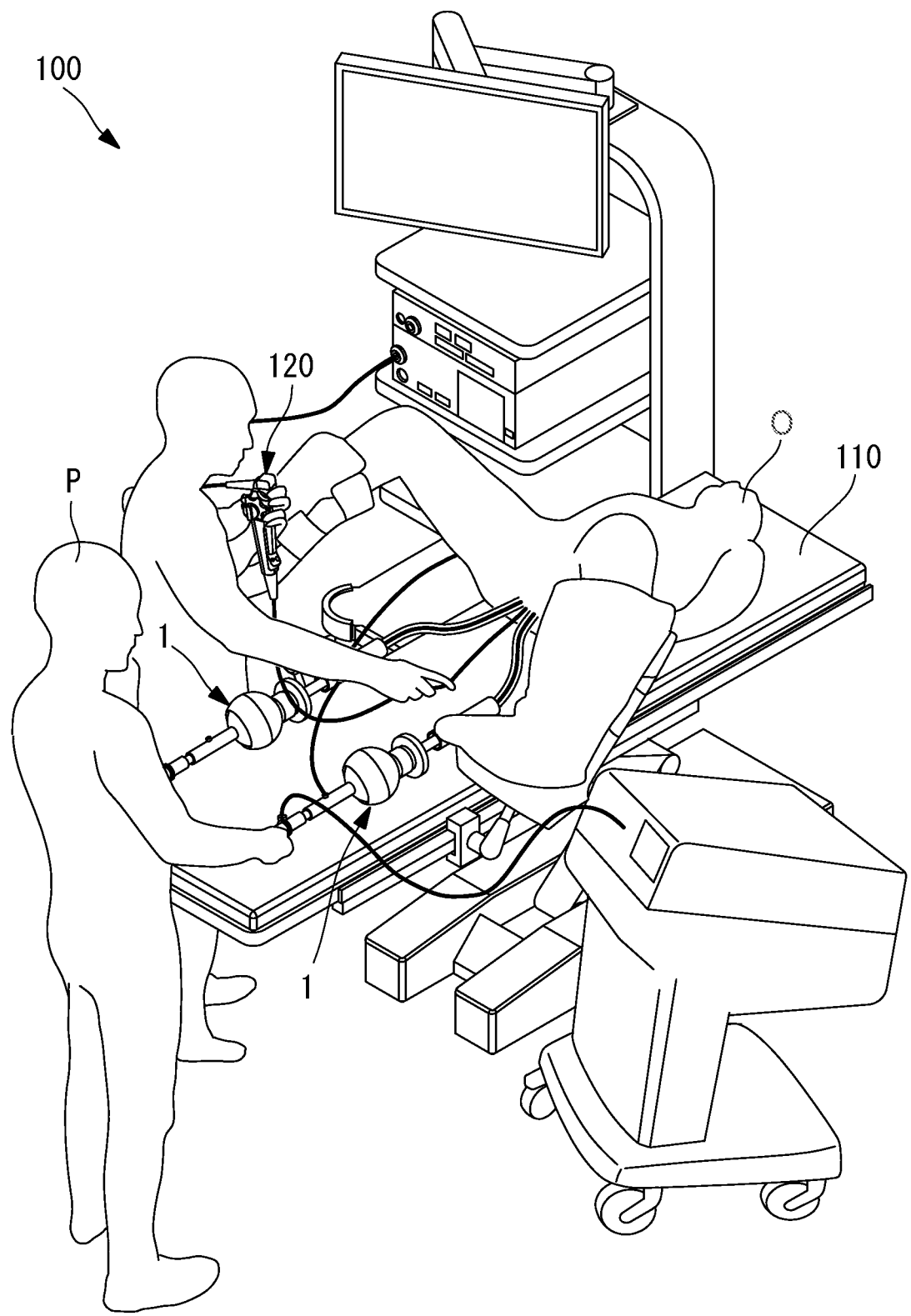
FIG. 1 shows an overall configuration diagram of a medical manipulator system including a medical manipulator according to an embodiment of the present invention.

A medical manipulator 1 according to this embodiment is included in a medical manipulator system 100 shown in FIG. 1 and is a treatment tool that is inserted, via his/her anus, into a body cavity of a patient O laying down on an operating table 110, together with an endoscope 120.

Figure 2:
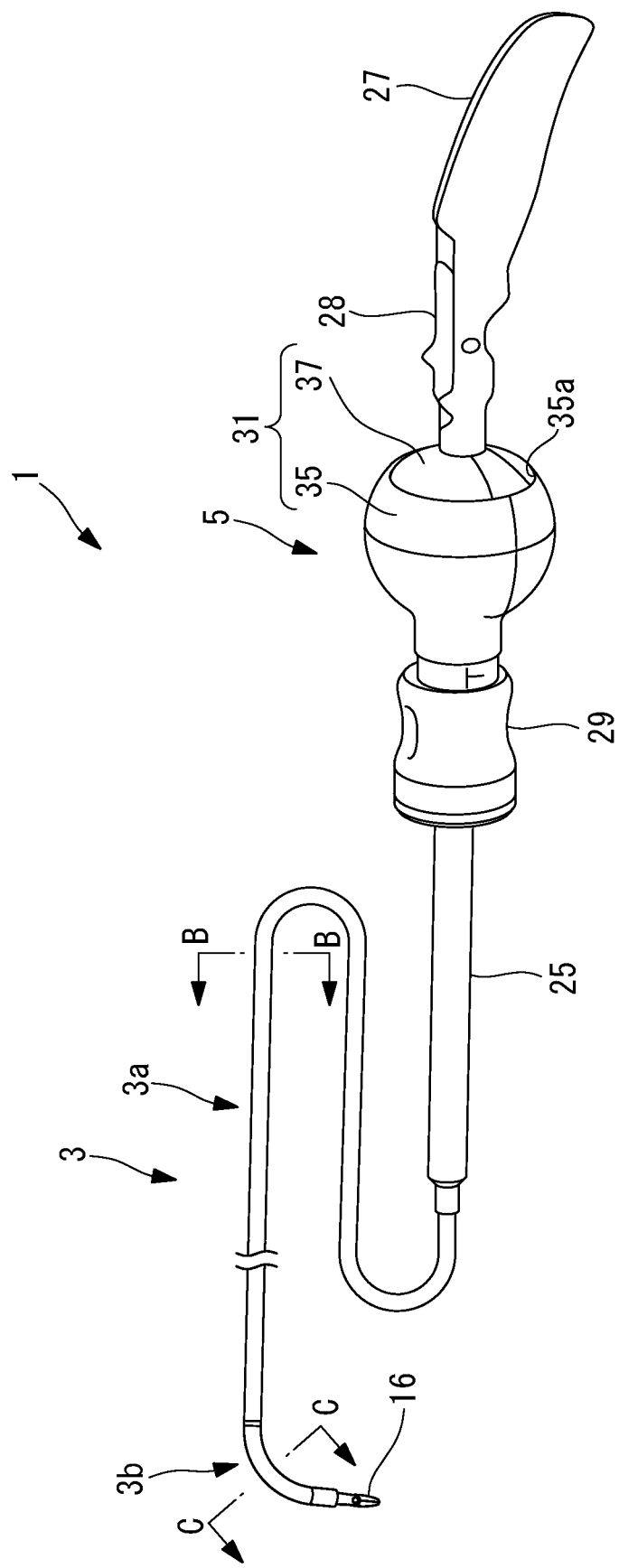
FIG. 2 shows an overall configuration diagram of the medical manipulator in FIG. 1.
Figure 3:
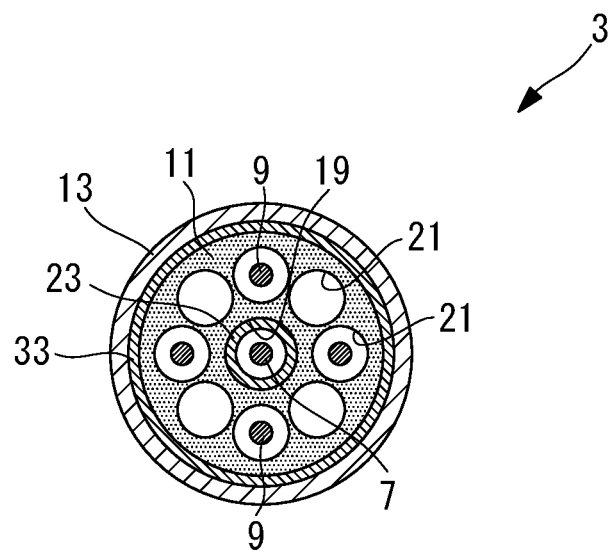
FIG. 3 is a section view taken along B-B in FIG. 2.
Figure 4:
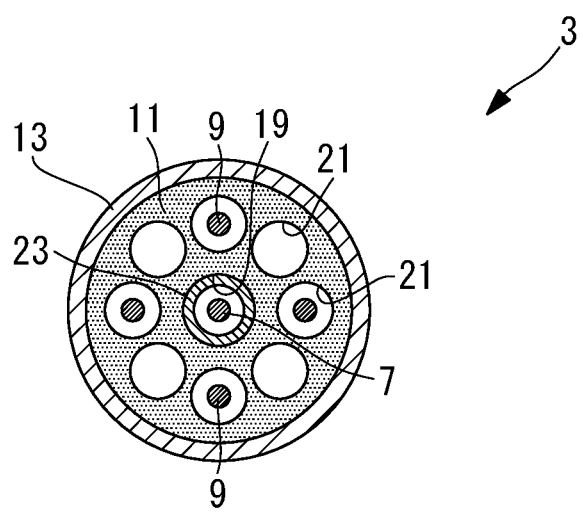
FIG. 4 is a section view taken along C-C in FIG. 2.
Figure 5:
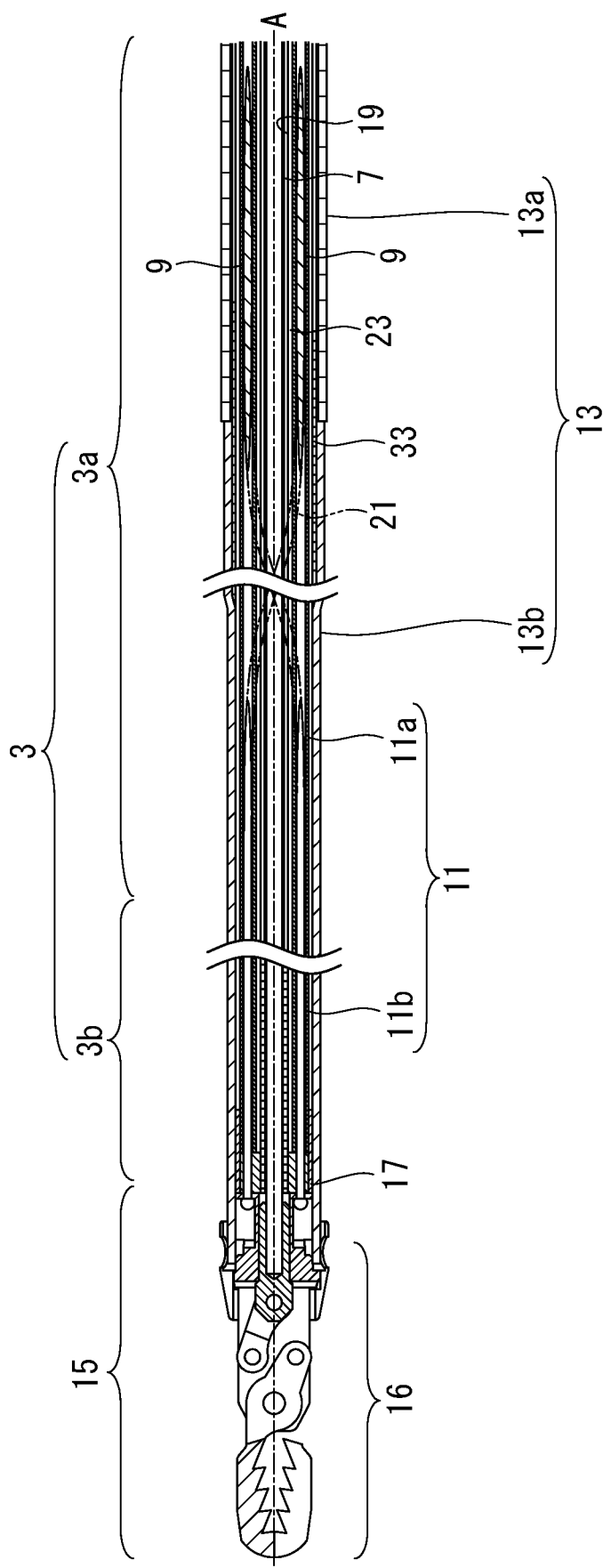
FIG. 5 is a section view in which a flexible shaft in FIG. 2 is cut in a longitudinal axis direction.

As shown in FIGS. 1 and 2, the medical manipulator 1: includes a long flexible shaft (inserted portion) 3; an operating unit (operation portion) 5 that is connected to a proximal end of the flexible shaft 3 and that is manually operated by an operator P; and various wires 7 and 9 that transmit, to the flexible shaft 3, a motive force associated with an operation performed on the operating unit 5 (see FIGS. 3, 4, and 5).

As shown in FIGS. 3, 4, and 5, the flexible shaft 3 includes: a tubular multi-lumen tube 11 that has a plurality of lumens 19 and 21 into which the various wires 7 and 9 are inserted; a tubular cover 13 that covers an area surrounding the multi-lumen tube 11; a distal-end portion (movable portion) 15 that is disposed at a distal end of the multi-lumen tube 11; and a reinforcement member 17 consisting of a flexible, tubular member that reinforces the connection between the distal-end portion 15 and the multi-lumen tube 11.

The distal-end portion 15 is provided with gripping forceps (end effector) 16 for treating biological tissue. Note that, although the gripping forceps are employed in this embodiment, a knife, scissors, or the like driven by the wire 7 can also similarly be employed.

Figure 6:
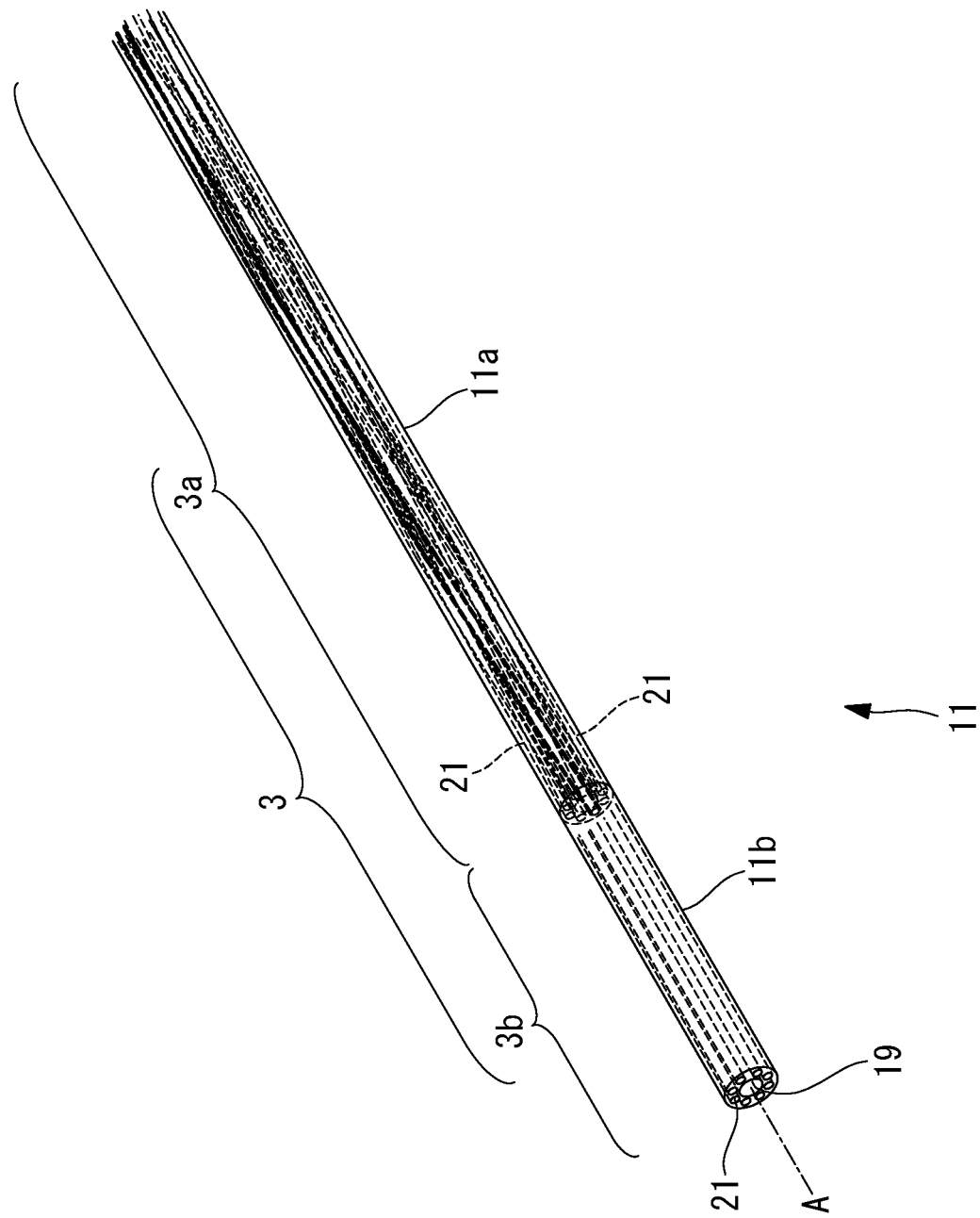
FIG. 6 is a perspective view showing a distal-end side of a multi-lumen tube in FIG. 5.

As shown in FIGS. 5 and 6, the multi-lumen tube 11 includes an elongated flexible portion (long portion) 11a having flexibility and a bending portion 11b that is disposed at a distal end of the flexible portion 11a and that is bendable in a direction intersecting a longitudinal axis A of the flexible portion 11a.

The flexible portion 11a and the bending portion 11b are joined by being fused in a state in which the distal end of the flexible portion 11a and a proximal end of the bending portion 11b are connected in a longitudinal axis A direction.

A proximal-end portion of the flexible portion 11a is pulled out from a proximal end of the cover 13 and is disposed inside the operating unit 5. The details of the configuration of the flexible portion 11a will be described later.

At a distal-end portion of the bending portion 11b, the distal-end portion 15 is fused and secured thereto. Specifically, as a result of the bending portion 11b, the distal-end portion 15, and the reinforcement member 17 being fused in a state in which an area surrounding a boundary between the distal-end portion of the bending portion 11b and the distal-end portion 15 is covered with the reinforcement member 17, the distal-end portion 15 is joined to the distal-end portion of the bending portion 11b. With the reinforcement member 17, the bending portion 11b and the distal-end portion 15 are more firmly joined with each other, and thus, it is possible to ensure a stable strength therein. Therefore, it is possible to cause the distal-end portion 15 to perform a motion with a higher sensitivity with respect to motions of the flexible portion 11a and the bending portion 11b.

As shown in FIGS. 3, 4, and 5, the flexible portion 11a and the bending portion 11b are provided with: a first lumen 19 that passes through a position containing a center axis of the multi-lumen tube 11 in the longitudinal axis A direction; and a plurality of, for example, eight, second lumens 21 that pass through the multi-lumen tube 11 radially outside the first lumen 19 in the longitudinal axis A direction. The first lumen 19 of the flexible portion 11a and the first lumen 19 of the bending portion 11b form a single continuous through-hole, and the respective second lumens 21 of the flexible portion 11a and the respective second lumens 21 of the bending portion 11b also respectively form continuous through-holes.

The driving wire (first wire) 7 that drives the gripping forceps 16 is inserted into the first lumen 19. In addition, the first lumen 19 accommodates, in the entire region thereof in the longitudinal direction, a reinforcement coil (long coil) 23 formed from a material having a greater rigidity than the flexible portion 11a and the bending portion 11b.

A distal-end portion of the driving wire 7 is secured to the distal-end portion 15. A proximal-end portion of the driving wire 7 is secured to the operating unit 5 in the state in which the driving wire 7 is pulled out from the first lumen 19. The driving wire 7 can be advanced/retracted in a direction along the longitudinal axis A of the flexible portion 11a, the gripping forceps 16 are opened/closed by the advancing/retracting motion of the driving wire 7.

In the reinforcement coil 23, one end thereof in the longitudinal direction is secured to the distal-end portion 15 by being bonded thereto or abutted thereagainst and the other end thereof in the longitudinal direction is secured to an operation handle 27, described later, in the operating unit 5 by being crimped, bonded, or brazed thereto. As the reinforcement coil 23, a so-called round wire coil having a circular sectional shape or a flat wire coil having a rectangular sectional shape is employed. It is preferable that a flat wire coil be employed in view of being capable of reducing the diameter of the multi-lumen tube 11, as compared with a round wire coil. The reinforcement coil 23 is disposed, for example, along an inner surface of the first lumen 19 radially outside the driving wire 7.

The eight second lumens 21 are disposed with substantially equal spacings therebetween in a circumferential direction about the longitudinal axis A of the multi-lumen tube 11. Of the eight second lumens 21, one bending wire (second wire) 9 is inserted into each of the four second lumens 21 respectively corresponding to the top, bottom, left, and right of the bending portion 11b. The top-to-bottom direction and the left-to-right direction of the bending portion 11b are directions that are respectively perpendicular to the longitudinal axis A of the multi-lumen tube 11 and that are perpendicular to each other. Nothing is inserted into the remaining four second lumens 21 of the eight second lumens 21 and said second lumens are hollow.

At a distal end of each of the bending wires 9, a sphere 9a, which has an outer diameter that is greater than the outer diameter of a cross-section of a bending wire 9 perpendicular to the longitudinal axis thereof, is provided. As a result of the respective spheres 9a being embedded in the distal-end portion 15, distal-end portions of the respective bending wires 9 are secured to the distal-end portion 15. Proximal-end portions of the respective bending wires 9 are secured to the operating unit 5 in the state in which the respective bending wires 9 are pulled out from the respective second lumens 21. Each of the bending wires 9 can be advanced/retracted in a direction along the longitudinal axis A of the flexible portion 11a. When a bending wire 9 is retracted toward a proximal end thereof, the bending portion 11b is bent in the direction corresponding to the retracted bending wire 9.

As shown in FIG. 6, in the bending portion 11b, the respective second lumens 21 are formed so as to be parallel to each other along the longitudinal direction at positions with substantially equal spacings therebetween in the circumferential direction about the longitudinal axis A. In contrast, as shown in FIG. 6, in the flexible portion 11a, the respective second lumens 21 are formed in spiral shapes about the longitudinal axis A.

When the flexible portion 11a is bent, the shapes of the respective second lumens 21 in the flexible portion 11a also change together with the bending of the flexible portion 11a. As a result of the respective second lumens 21 in the flexible portion 11a having the spiral shapes, it is possible to suppress large changes in the contact states between inner surfaces of the respective second lumens 21 and the respective bending wires 9 caused by the bending state of the flexible portion 11a.

Accordingly, it is possible to eliminate route differences among the respective bending wires 9 generated in the case in which the medical manipulator 1 is inserted into a lumen, such as the large intestine. Therefore, it is not necessary to make motive forces from the operating unit 5 greatly differ among the respective bending wires 9 in accordance with the bent state of the flexible portion 11a, and thus, it is possible to enhance the maneuverability and the controllability of the bending portion 11b.

It is preferable that the respective spiral-shaped second lumens 21 have shapes that are twisted in one direction at a certain pitch and a certain radius. With the spiral-shaped second lumens 21 having a uniform pitch, it is possible to achieve uniform performance in the respective sections of the multi-lumen tube 11 and it is possible to enhance the ease of manufacturing.

As shown in FIG. 5, the cover 13 includes a flexible-portion cover member 13a, which is mainly disposed in an area surrounding the flexible portion 11a, and a bending-portion cover member 13b, which is mainly disposed in an area surrounding the bending portion 11b. In the following, as shown in FIG. 5, of the flexible shaft 3, a portion consisting of the flexible portion 11a and the flexible-portion cover member 13a is assumed to be a shaft flexible portion 3a, and a portion consisting of the bending portion 11b and the bending-portion cover member 13b is assumed to be a shaft bending portion 3b.

A distal-end portion of the flexible-portion cover member 13a is secured to an outer surface of the flexible portion 11a and a proximal-end portion thereof is secured to the operating unit 5. A distal-end portion of the bending-portion cover member 13b is secured to the distal-end portion 15 and a proximal-end portion thereof is secured to the outer surface of the flexible portion 11a by being bonded thereto. The flexible-portion cover member 13a and the bending-portion cover member 13b are integrally formed by being fused in a state in which end surfaces of the respective members are connected with each other, in other words, in a state in which a distal-end surface of the flexible-portion cover member 13a and a proximal-end surface of the bending-portion cover member 13b are connected in the longitudinal axis A direction.

The bending-portion cover member 13b is formed of a material having a greater flexibility than the flexible-portion cover member 13a. The bending-portion cover member 13b is secured to a side surface of a distal-end portion of a rotational-force transmission coil 33, described later, by being bonded or fused thereto. In addition, it is desirable that the flexible-portion cover member 13a and the bending-portion cover member 13b both be formed of an insulating material. For example, a low-density polyethylene is employed as a material for the flexible-portion cover member 13a and, for example, a styrene-based elastomer is employed as a material for the bending-portion cover member 13b.

As a result of the bending-portion cover member 13b being more flexible than the flexible-portion cover member 13a, it is possible to more smoothly bend the shaft bending portion 3b. In addition, as a result of the flexible-portion cover member 13a and the bending-portion cover member 13b both having insulating properties, in the case in which a high-frequency scalpel is used together with the medical manipulator 1, it is possible to prevent the high-frequency current of the high-frequency scalpel from energizing the medical manipulator 1.

Figure 7:
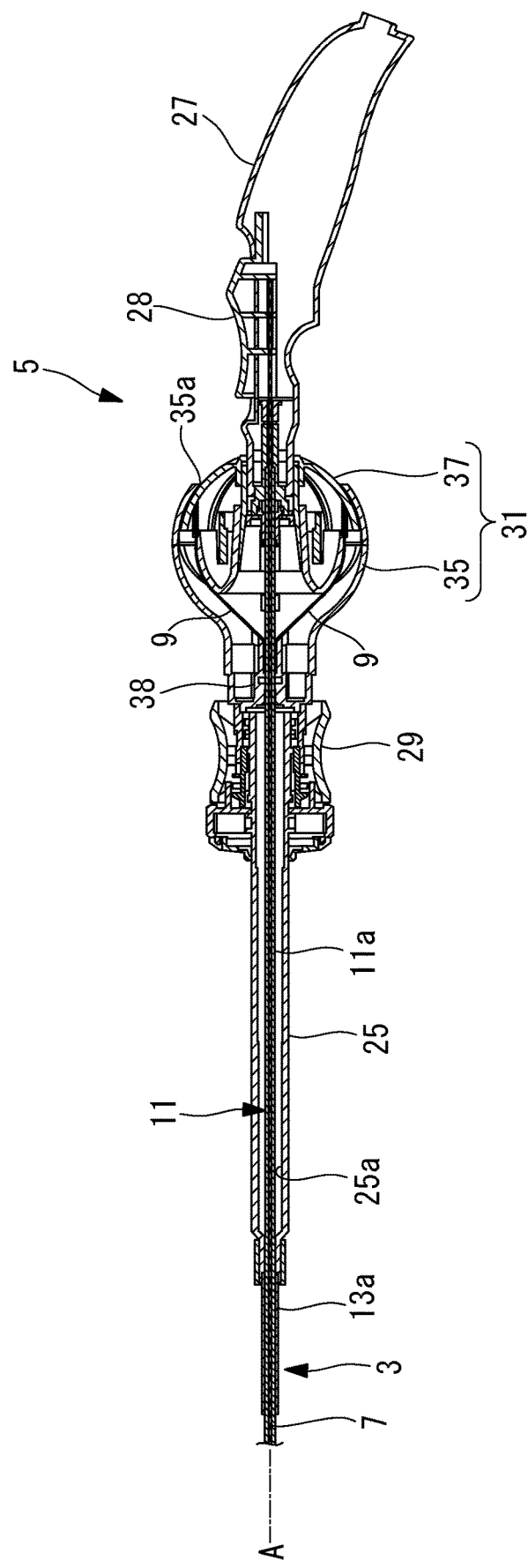
FIG. 7 is a sectional view in which an operating unit in FIG. 2 is cut in the longitudinal axis direction.

As shown in FIGS. 2 and 7, the operating unit 5 includes: a rigid rotation shaft 25 that extends so as to be coaxial with the flexible shaft 3; the operation handle (end-effector operating member) 27 that is disposed on a proximal-end side of the rotation shaft 25 and that is gripped by the operator P; a rotational operation portion 29 that is secured to a proximal end of the rotation shaft 25 and that is for causing the flexible shaft 3 and the rotation shaft 25 to be rotated; a bending operation portion 31 that is disposed between the rotational operation portion 29 and the operation handle 27 and that is for causing the bending portion 11b of the multi-lumen tube 11 to be bent; and the rotational-force transmission coil 33 that transmits a rotational force to the flexible shaft 3 (see FIGS. 3 and 5).

The rotation shaft 25 has a shaft through-hole 25a that passes therethrough along the longitudinal axis A. The proximal-end portion of the flexible-portion cover member 13a is secured to the distal-end portion of the shaft through-hole 25a. In addition, the flexible portion 11a of the multi-lumen tube 11 pulled out from the proximal end of the flexible-portion cover member 13a passes through the shaft through-hole 25a.

Figure 8:
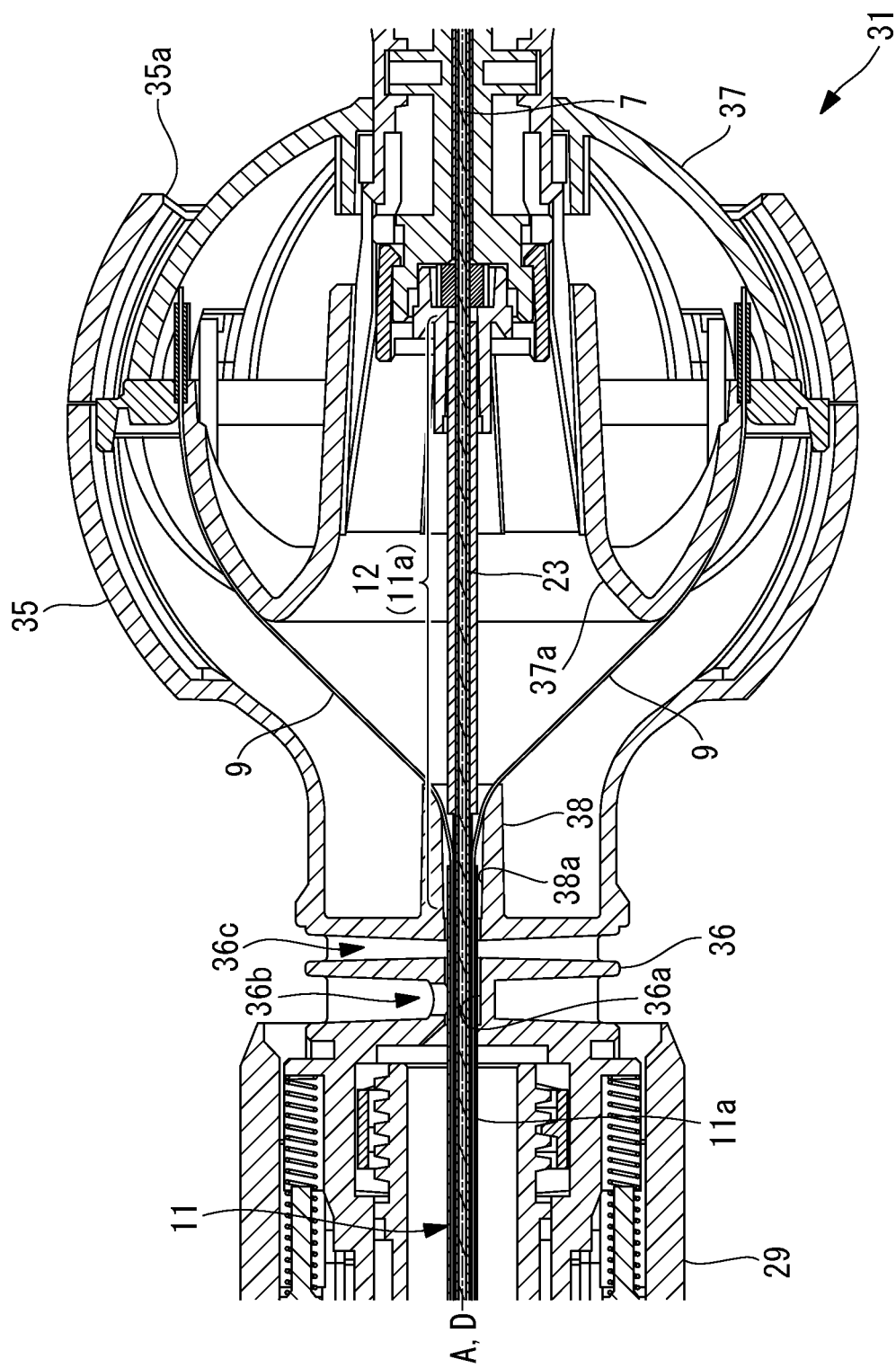
FIG. 8 is an enlarged sectional view of a bending operation portion in FIG. 7.

As shown in FIGS. 7 and 8, the bending operation portion 31 has a ball joint structure having a substantially spherical hollow socket (first spherical housing) 35 and a substantially spherical hollow ball (second spherical housing) 37 engaged with the socket 35, in the interior thereof, in a rotatable manner.

The socket 35 is connected to the proximal end of the rotation shaft 25. The socket 35 has a shape in which a portion of the sphere on a proximal-end side is cut out along a plane orthogonal to the longitudinal axis A of the rotation shaft 25. The cutout proximal-end surface of the socket 35 is open. The cutout proximal-end surface of the socket 35 is assumed to be an opening 35a. The socket 35 is formed in a spherical shape larger than a hemisphere. Accordingly, the ball 37 is held inside the socket 35 without falling out of the opening 35a of the socket 35.

The ball 37 is supported by an inner surface of the socket 35 at a position at which a center point of the ball 37 is aligned with a center point of the socket 35. Accordingly, the ball 37 is rotatable in an arbitrary direction about the center points with respect to the socket 35.

The operation handle 27 is connected to an outer surface of the ball 37 exposed to the exterior from the opening 35a of the socket 35 and extends toward the opposite side from the rotation shaft 25 and the socket 35. As shown in FIG. 2, the operation handle 27 is provided with a slider 28 for the operator P to open/close the gripping forceps 16. The slider 28 is provided so as to be movable in a direction for moving close to or moving away from the socket 35 with respect to the operation handle 27.

Figure 9:
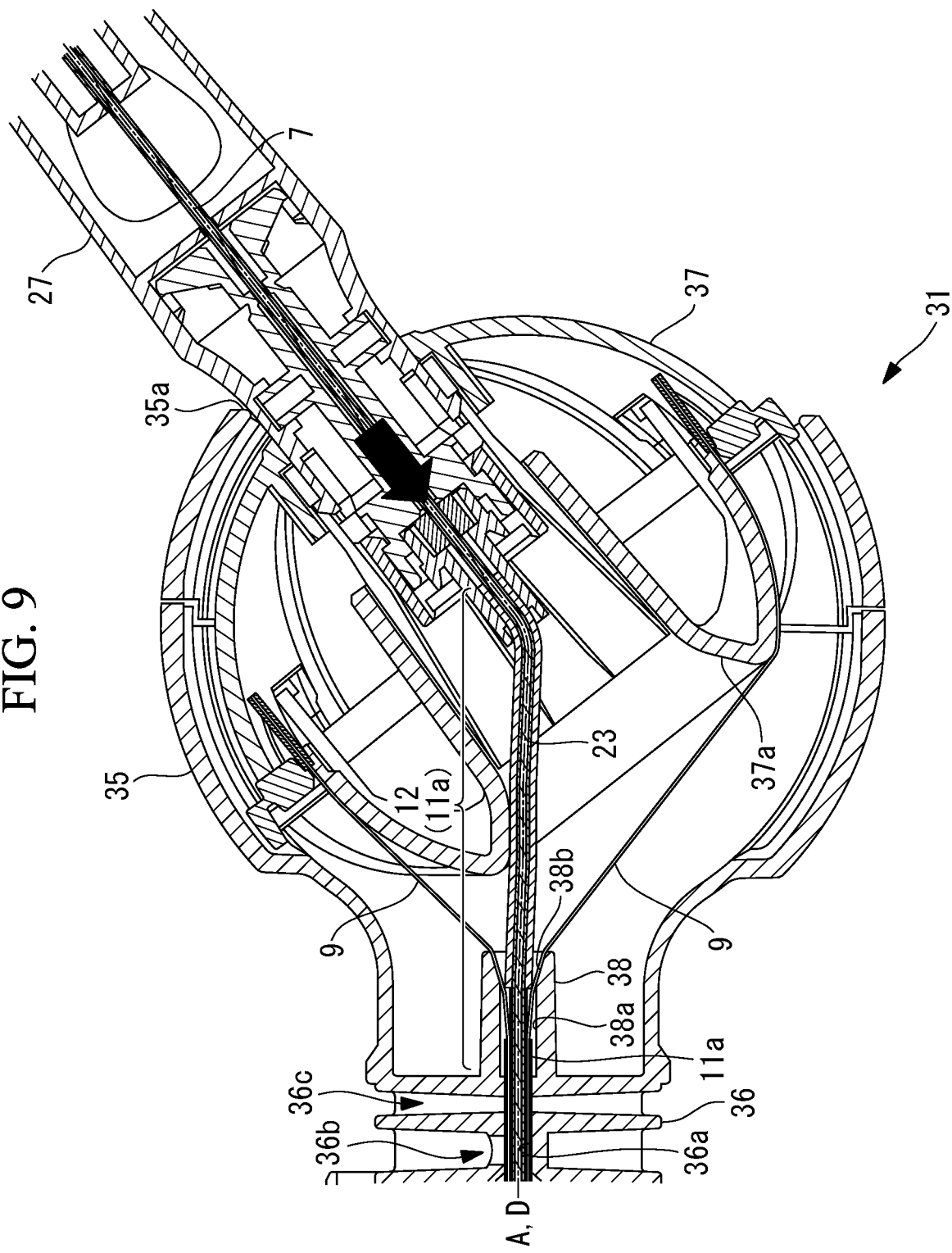
FIG. 9 is an enlarged sectional view of the bending operation portion showing a state in which an operation handle in FIG. 8 is tilted.

As shown in FIG. 7, at the neutral position, the operation handle 27 is aligned with the rotation shaft 25 in a straight line. In addition, the operation handle 27 is tilted in an arbitrary direction about the center points of the socket 35 and the ball 37 due to the rotation of the ball 37 in the socket 35. For example, as shown in FIG. 9, it is possible to tilt the operation handle 27 to a prescribed maximum tilt angle at which the operation handle 27 abuts against an edge of the opening 35a of the socket 35. In other words, the edge of the opening 35a functions as a limiter that restricts the rotational angle of the ball 37 in the socket 35 within a prescribed angular range.

In the socket 35, the four bending wires 9 pulled out from the second lumen 21 of the flexible portion 11a are disposed between the inner surface of the socket 35 and the outer surface of the ball 37. In the state in which the operation handle 27 is disposed at the neutral position, the respective proximal ends of the four bending wires 9 are secured to the outer surface of the ball 37 at positions with substantially equal spacings therebetween in the circumferential direction about the longitudinal axis A.

For example, when the operation handle 27 is tilted in the right direction, the bending portion 11b of the multi-lumen tube 11 bends leftward as a result of the left bending wire 9 being pulled and the right bending wire 9 being pushed out due to the rotation of the ball 37 in the right direction. When the operation handle 27 is tilted in the left direction, the bending portion 11b bends rightward as a result of the right bending wire 9 being pulled and the left bending wire 9 being pushed out due to the rotation of the ball 37 in the left direction. At this time, because the top and bottom bending wires 9 are not pulled or pressed by the ball 37, the angle of the bending portion 11b in the top-to-bottom direction does not change.

When the operation handle 27 is tilted in the top direction, the bending portion 11b bends downward as a result of the bottom bending wire 9 being pulled and the top bending wire 9 being pushed out due to the rotation of the ball 37 in the top direction. When the operation handle 27 is tilted in the bottom direction, the bending portion 11b bends upward as a result of the top bending wire 9 being pulled and the bottom bending wire 9 being pushed out due to the rotation of the ball 37 in the bottom direction. At this time, because the left and right bending wires 9 are not pulled or pressed by the ball 37, the angle of the bending portion 11b in the left-to-right direction does not change.

Here, the configurations of the bending operation portion 31 and the flexible portion 11a of the multi-lumen tube 11 will be described in more detail.

As shown in FIG. 8, the socket 35 includes: a cylindrical connection sleeve (tube support portion) 36 that extends, on a distal-end side of the sphere, toward the rotation shaft 25 along the longitudinal axis A; and a cylindrical insertion port 38 that extends, from the connection sleeve 36, toward the interior of the sphere along the longitudinal axis A.

A proximal-end portion of the rotation shaft 25 is connected to the connection sleeve 36 so as to be rotatable about the longitudinal axis A. The connection sleeve 36 holds the rotation shaft 25 and the bending operation portion 31 in a relatively rotatable manner about the longitudinal axis A with respect to each other. The connection sleeve 36 has a sleeve inner hole (support portion inner hole) 36a through which the flexible portion 11a of the multi-lumen tube 11 that has passed through the shaft through-hole 25a of the rotation shaft 25 passes.

The connection sleeve 36 is provided with a bonding hole 36b that passes therethrough in a radial direction via the sleeve inner hole 36a. By means of an adhesive loaded into the sleeve inner hole 36a via the bonding hole 36b, the flexible portion 11a of the multi-lumen tube 11 that passes through the sleeve inner hole 36a is secured to the sleeve inner hole 36a. Accordingly, the flexible portion 11a of the multi-lumen tube 11 is supported by the connection sleeve 36. The bonding hole 36b is formed at a position separated from the insertion port 38 of the socket 35 by a bonding clearance portion 36c interposed therebetween.

The bonding clearance portion 36c is a space formed by, between the bonding hole 36b and the insertion port 38, a through-hole that passes through the connection sleeve 36 in a radial direction via the sleeve inner hole 36a. As a result of the adhesive injected from the bonding hole 36b flowing into the space in the bonding clearance portion 36c via the sleeve inner hole 36a, the flow of the adhesive flowing toward the insertion port 38 from the sleeve inner hole 36a is divided. Accordingly, the adhesive is prevented from flowing into the insertion port 38.

The insertion port 38 has an insertion port through-hole 38a that opens in the longitudinal axis A. The flexible portion 11a of the multi-lumen tube 11 that has passed through the sleeve inner hole 36a of the connection sleeve 36 is inserted into the insertion port through-hole 38a of the insertion port 38.

The ball 37 has a prescribed center axis D that is aligned with the longitudinal axis A of the rotation shaft 25 in a straight line in the state in which the operation handle 27 is disposed at the neutral position. In the ball 37, a ball through-hole 37a that passes therethrough along the center axis D is formed. The ball through-hole 37a has a truncated conical shape in which the diameter thereof gradually increases toward the distal end.

The flexible portion 11a of the multi-lumen tube 11, inserted into the socket 35 from the insertion port 38 of the socket 35, is inserted into the ball through-hole 37a. As a result of the ball through-hole 37a having the truncated conical shape in which the diameter thereof gradually increases toward the distal end, in the case in which the operation handle 27 is tilted to the prescribed maximum tilt angle at which the operation handle 27 abuts against the edge of the opening 35a of the socket 35, it is possible to avoid interference between the ball through-hole 37a and the flexible portion 11a of the multi-lumen tube 11.

The above-described flexible portion 11a of the multi-lumen tube 11 is secured at the connection sleeve 36 of the socket 35 by being bonded thereto and is disposed along the longitudinal axis A in the spaces in the socket 35 and the ball 37. The proximal end of the flexible portion 11a is secured to the distal-end portion of the operation handle 27.

The flexible portion 11a is formed of a resin having a greater bending rigidity than the reinforcement coil 23 and has a rigidity that allows bending without being twisted, for example, even in the case in which the operation handle 27 is maximally tilted. The proximal-end portion of the flexible portion 11a is disposed at a position at which the proximal-end portion covers an area surrounding the reinforcement coil 23 in the spaces in the socket 35 and the ball 37 and functions as a reinforcement rube that reinforces the reinforcement coil 23. In the following, the proximal-end portion of the flexible portion 11a will be referred to as the reinforcement tube 12.

Figure 10:
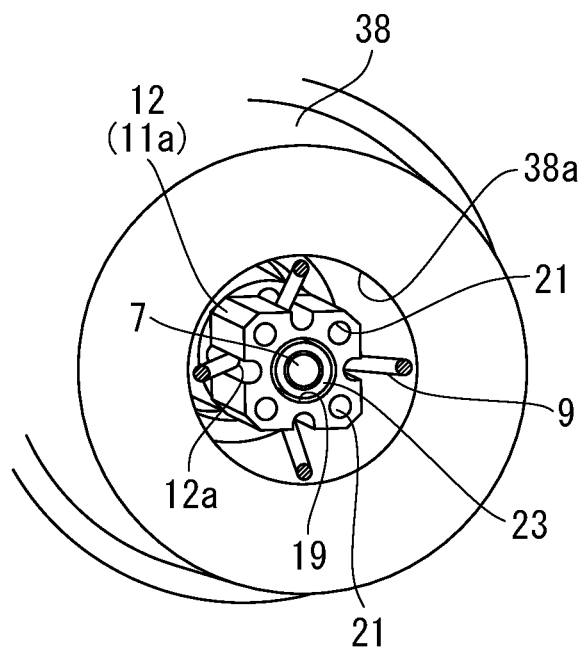
FIG. 10 is a sectional view in which a reinforcement tube in FIG. 8 is cut in a direction orthogonal to a longitudinal axis.

The reinforcement tube 12 guides the driving wire 7 and the respective bending wires 9. For example, as shown in FIG. 10, at intermediate positions in the longitudinal axis A direction, one end of each of the four second lumens 21 opens in an outer surface of the reinforcement tube 12 and groove-like four slits (openings) 12a, respectively extending in the longitudinal axis A direction, are provided.

A proximal end of the driving wire 7 guided by the reinforcement tube 12 is secured to the slider 28 of the operation handle 27 in a state in which the proximal end is pulled out from a proximal end of the reinforcement tube 12. The driving wire 7 is advanced/retracted in a direction along the longitudinal axis A as a result of an operation for moving the slider 28 so as to move close to/away from the socket 35. The gripping forceps 16 is opened/closed as a result of the driving wire 7 being advanced/retracted.

The proximal ends of the four bending wires 9 guided by the reinforcement tube 12 pass through between the inner surface of the socket 35 and the outer surface of the ball 37 and are secured to the outer surface of the ball 37 in a state in which the proximal ends are respectively protruding outside the reinforcement tube 12 from the respective slits 12a.

Figure 11:
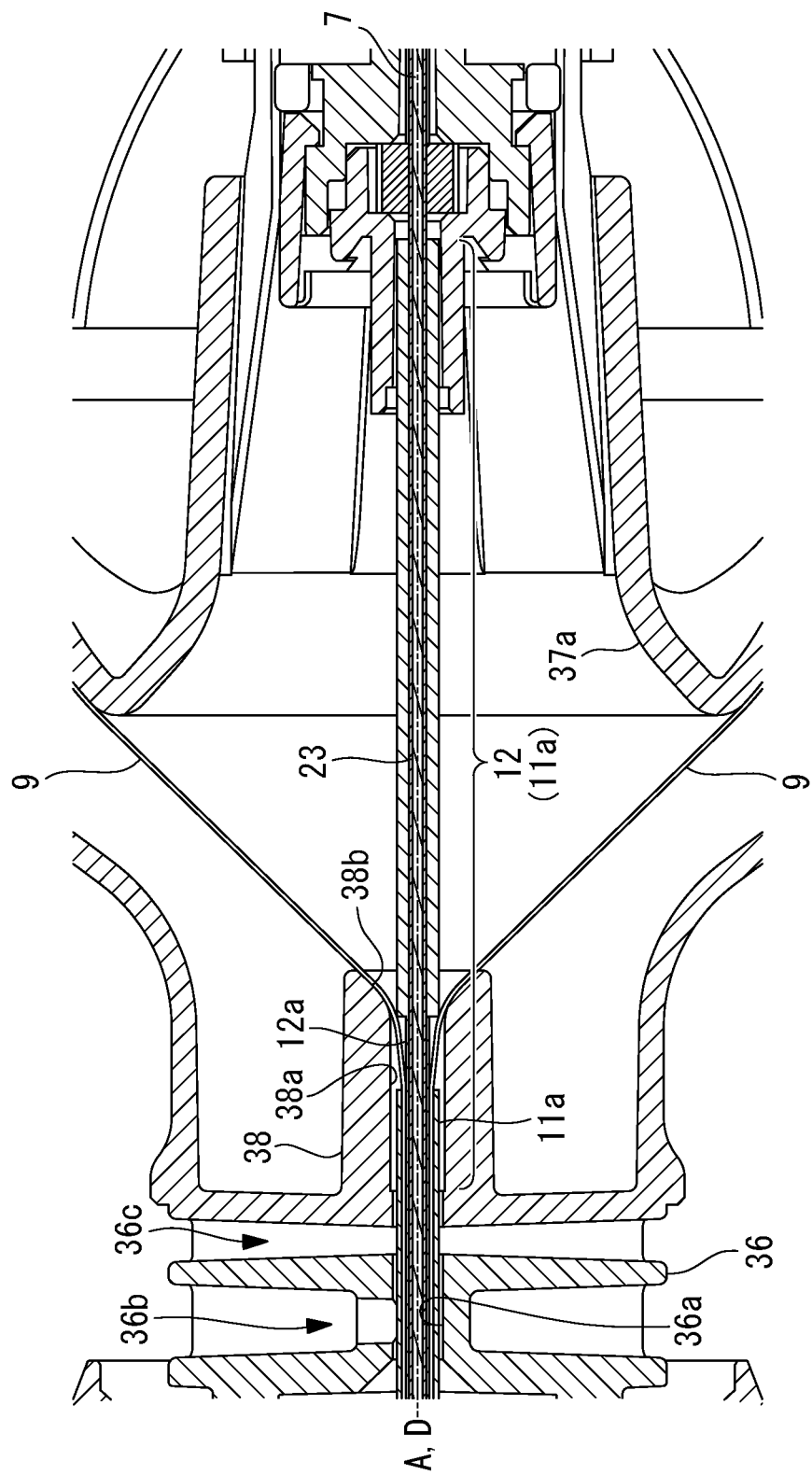
FIG. 11 is an enlarged sectional view in which periphery of an insertion port of a socket in FIG. 8 is enlarged.

For example, as shown in FIG. 11, the insertion port 38 of the socket 35 has a dimension such that the inner diameter of the insertion port through-hole 38a is slightly greater than the outer diameter of the reinforcement tube 12. The insertion port through-hole 38a is provided with a guide portion 38b that guides the bending wires 9 extending toward the outer surface of the ball 37 from the slits 12a of the reinforcement tube 12 to a direction along the longitudinal direction of the reinforcement tube 12.

The guide portion 38b has a curved shape in which the radius of the insertion port through-hole 38a gradually smoothly increases toward the proximal end; in other words, the guide portion 38b has a shape that spreads outward in a rounded manner. The guide portion 38b is disposed closer to the ball 37, in other words, farther on the proximal-end side than the slits 12a of the reinforcement tube 12.

The rotational operation portion 29 is a rotating handle that is disposed so as to be coaxial with the rotation shaft 25. The rotational operation portion 29 is provided with a locking mechanism (not shown) for locking the rotation of the rotational operation portion 29 with respect to the bending operation portion 31 and the operation handle 27.

The rotational-force transmission coil 33 consists of, for example, three layers of coils disposed in a laminated state in a radial direction. As shown in FIG. 5, the rotational-force transmission coil 33 is disposed, for example, between the flexible portion 11a of the multi-lumen tube 11 and the flexible-portion cover member 13a thereof along the longitudinal axis A. One end of the rotational-force transmission coil 33 in the longitudinal direction is secured to the distal end of the flexible portion 11a and the other end thereof in the longitudinal direction is secured to the rotation shaft 25.

When the rotational operation portion 29 is rotated about the longitudinal axis A, the flexible shaft 3 and the rotation shaft 25 rotate about the longitudinal axis A. Specifically, due to the rotation of the rotational operation portion 29, the rotation shaft 25 rotates about the longitudinal axis A with respect to the bending operation portion 31 and the operation handle 27. When the rotation shaft 25 rotates, the rotational force about the longitudinal axis A is transmitted to the proximal-end portion of the flexible-portion cover member 13a connected to the rotation shaft 25 and the rotational force about the longitudinal axis A is transmitted to a distal-end portion of the flexible portion 11a by the rotational-force transmission coil 33 connected to the rotation shaft 25. Accordingly, the entire flexible shaft 3, including the bending portion 11b, rotates about the longitudinal axis A together with the rotational operation portion 29 and the rotation shaft 25.

Next, the operation of the medical manipulator 1, configured as described above, will be described.

In order to treat biological tissue inside a body of the patient O by using the medical manipulator 1 according to this embodiment, the flexible shaft 3 is inserted into the body via a channel of the endoscope 120 or a channel externally provided on the endoscope 120. Then, the flexible shaft 3 is disposed at a position at which a distal-end portion of the flexible shaft 3 is observed in an endoscope image.

The operator P rotates the flexible shaft 3 about the longitudinal axis A by means of the rotational operation of the rotational operation portion 29. In addition, the operator P bends the shaft bending portion 3b in an arbitrary direction intersecting the longitudinal axis A by means of the tilting operation of the operation handle 27.

Here, in accordance with the tilting operation of the operation handle 27, stresses such as friction act on the respective second lumens 21 as a result of the respective bending wires 9 corresponding to the tilting direction of the operation handle 27 being pushed and pulled in the respective second lumens 21. In particular, as a result of the second lumens 21 being formed in the spiral shapes in the flexible portion 11a of the multi-lumen tube 11, the stresses such as friction acting on the respective second lumens 21 increase as compared with a case in which the second lumens 21 are not formed in the spiral shapes.

With the medical manipulator 1 according to this embodiment, it is possible to prevent, by means of the reinforcement coil 23 that is disposed over the entire region of the first lumen 19 of the multi-lumen tube 11 and that is formed from a rigid material, the occurrence of compressive deformation both in the flexible portion 11a and the bending portion 11b. Accordingly, it is possible to enhance the maneuverability of the bending portion 11b and to bend the shaft bending portion 3b in a desired shape.

In addition, for example, as indicated by the arrow in FIG. 9, when the driving wire 7 is pressed to the distal-end side from the proximal-end side as a result of operating the slider 28 in the state in which the driving wire 7 and the reinforcement coil 23 are bent as a result of tilting the operation handle 27, a force is applied in a direction in which the driving wire 7 and the reinforcement coil 23 warp even more greatly.

In this case also, with the medical manipulator 1 according to this embodiment, the reinforcement tube 12 that is disposed at the position at which the reinforcement tube 12 covers the area surrounding the reinforcement coil 23 in the spaces in the socket 35 and the ball 37 and that has a high bending rigidity prevents the driving wire 7 and the reinforcement coil 23 from being warped even more greatly, and thus, it is possible to push the driving wire 7 in the longitudinal direction toward the distal end. Accordingly, it is possible to transmit the force from the operation handle 27 to the distal-end portion 15 without causing attenuation thereof.

In addition, as a result of guiding the driving wire 7 and the respective bending wires 9 by using a single reinforcement tube 12, it is possible to reduce the diameter of the medical manipulator 1, as compared with the case in which a guide member is provided for each of the wires 7 and 9. In addition, as a result of the reinforcement tube 12 having a bending rigidity that allows bending without being twisted depending on the amount by which the operation handle 27 is operated, it is possible to stabilize routes of the respective wires 7 and 9. Furthermore, as a result of the distal-end side of the reinforcement tube 12 being secured to the socket 35 and the other-end side thereof being secured to the operation handle 27, it is possible to prevent the position of the reinforcement tube 12 from being moved due to the operation of the bending operation portion 31 and it is possible to further stabilize the routes of the respective wires 7 and 9.

In addition, as a result of allowing the adhesive injected from the bonding hole 36b to escape into the bonding clearance portion 36c, the adhesive does not flow into the slits 12a of the reinforcement tube 12. Therefore, it is possible to prevent the distal-end side of the reinforcement tube 12 from being bonded to the socket 35 together with the bending wires 9 protruding from the slits 12a and it is possible to ensure sufficient sliding properties in the bending wires 9.

In addition, at a position farther on the proximal-end side than the slits 12a of the reinforcement tube 12, the guide portion 38b provisionally guides the bending wires 9 protruding from the slits 12a in the direction along the longitudinal axis A. Accordingly, in the case in which the bending wires 9 are pulled, the guide portion 38b receives the force that pulls the respective bending wires 9 protruding from the slits 12a in a direction intersecting the longitudinal axis A, and the respective bending wires 9 are pulled in the direction along the longitudinal axis A.

In other words, when the bending wires 9 are pulled, a large tensile force acts, in the longitudinal direction of the reinforcement tube 12, on the bending wires 9 protruding from the slits 12*a*. Therefore, as compared with a case in which a large tensile force acts, in a direction intersecting the longitudinal direction of the reinforcement tube 12, on the respective bending wires 9 protruding from the slits 12*a* of the reinforcement tube 12, it is possible to reduce friction due to contact between edges of the respective slits 12*a* and the respective bending wires 9 and it is possible to suppress damage to the bending wires 9.

Figure 12:
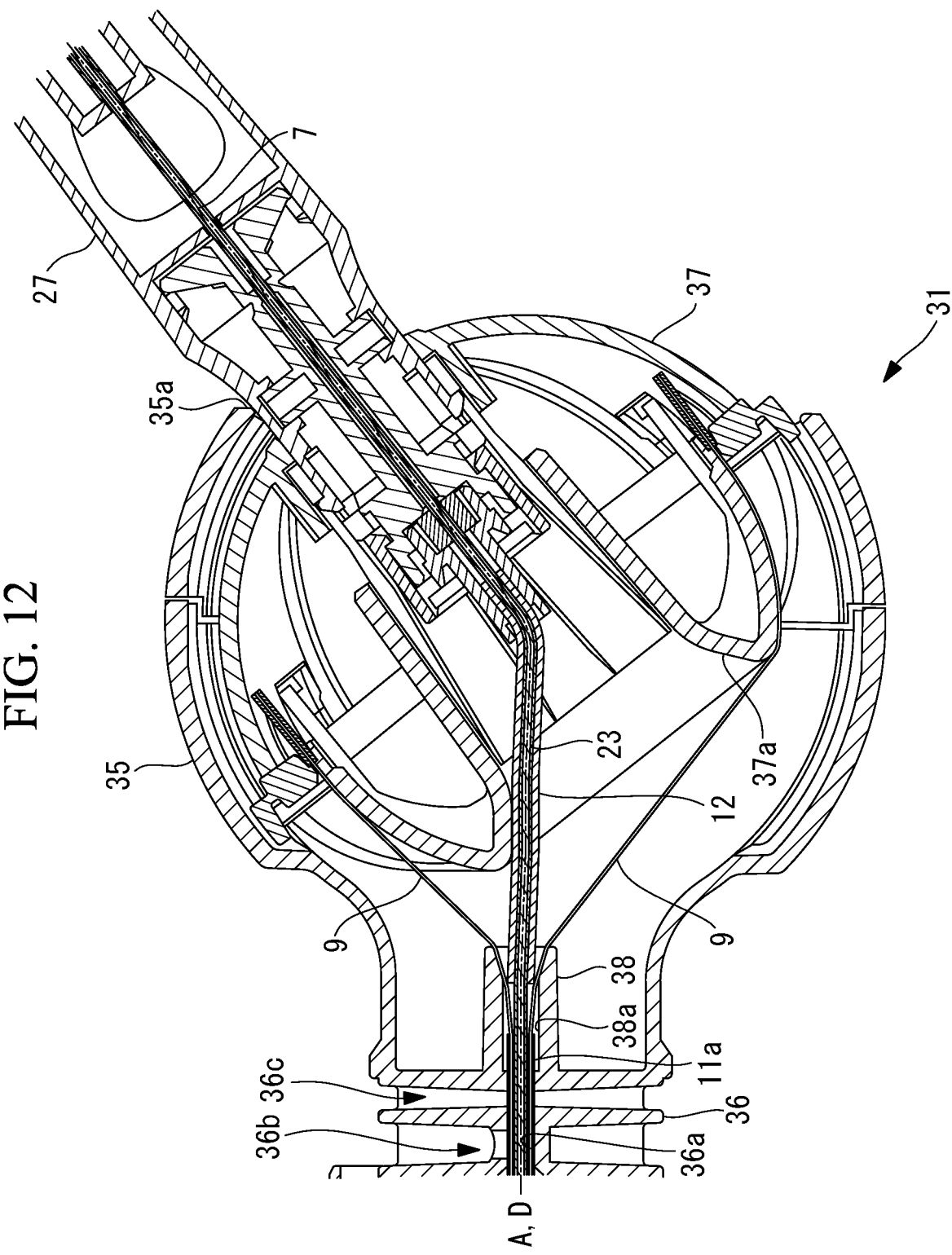
FIG. 12 is a sectional view of a bending operation portion showing a reinforcement tube according to a modification of the embodiment of the present invention.

In this embodiment, a portion of the flexible portion 11*a* of the multi-lumen tube 11 constitutes the reinforcement tube 12. Alternatively, for example, as shown in FIG. 12, a separate member from the multi-lumen tube 11 may constitute the reinforcement tube 12.

In this case, the proximal end of the multi-lumen tube 11 may be disposed at a position closer to the connection sleeve 36 in the insertion port through-hole 38*a* of the socket 35. In addition, the distal end of the reinforcement tube 12 may be secured to the guide portion 38*b* of the insertion port through-hole 38*a* at a position separated from the proximal end of the multi-lumen tube 11 in a direction along the longitudinal axis A and the proximal end of the reinforcement tube 12 may be secured to the distal-end portion of the operation handle 27. In addition, the reinforcement tube 12 may be constituted of a member similar to the flexible portion 11*a* of the multi-lumen tube 11. In addition, the distal end of the reinforcement tube 12 may be secured to the insertion port through-hole 38*a* of the socket 35 and the proximal end of the reinforcement tube 12 may be secured to the distal-end portion of the operation handle 27.

In this modification, only the driving wire 7 is guided by the reinforcement tube 12. The reinforcement tube 12 does not need to have the slits 12*a*, and the respective bending wires 9 pulled out from the proximal end of the second lumens 21 of the multi-lumen tube 11 may be secured to the outer surface of the ball 37 without passing through the reinforcement tube 12.

Figure 13:
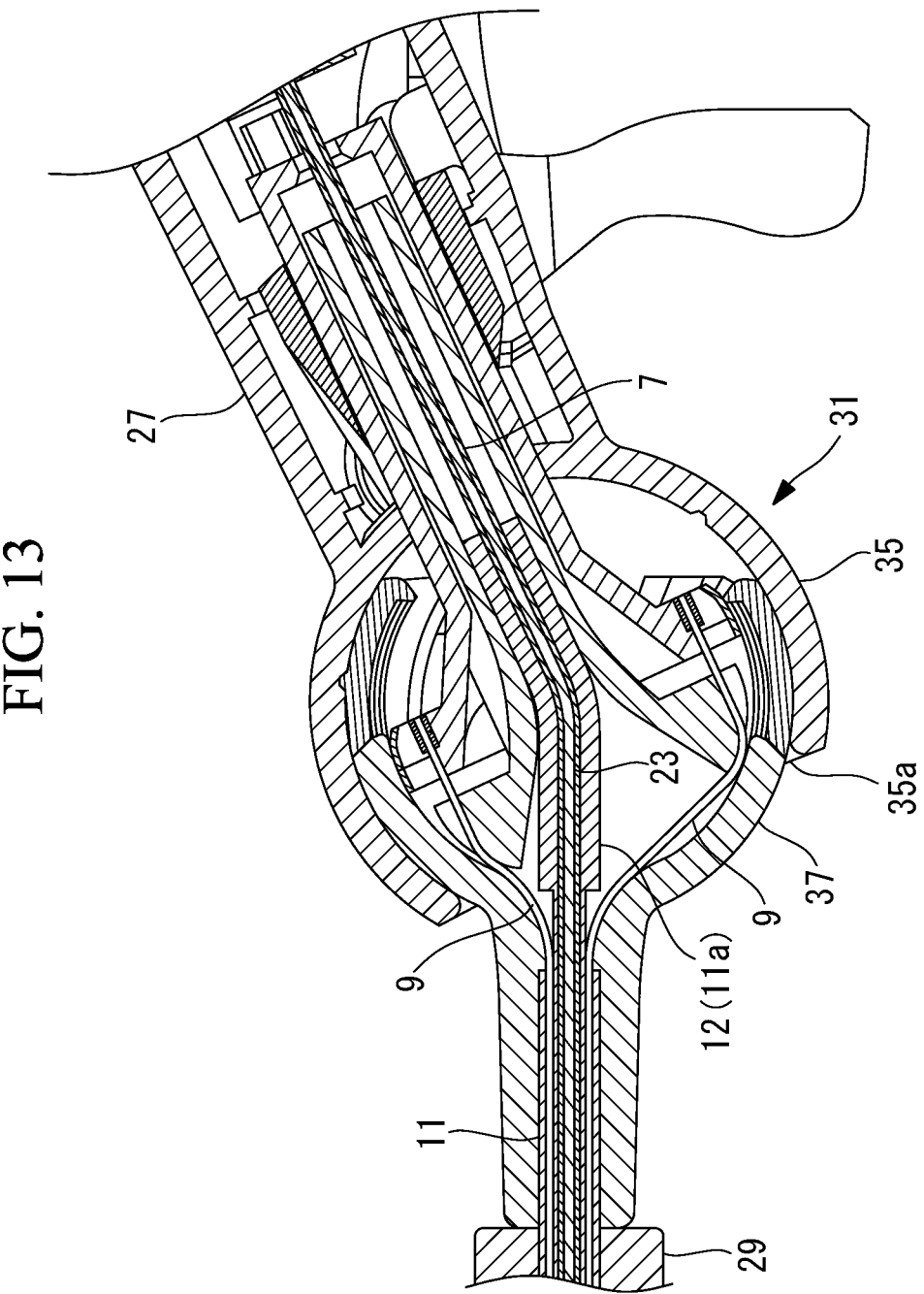
FIG. 13 is a sectional view of a bending operation portion according to another modification of the embodiment of the present invention.

In addition, in this embodiment, as the bending operation portion 31, a ball joint structure in which the socket 35 is secured to the rotation shaft 25 and the operation handle 27 is secured to the ball 37 has been described. Alternatively, for example, as shown in FIG. 13, a ball joint structure in which the ball 37 is secured to the rotation shaft 25 and the operation handle 27 is secured to the socket 35 that accommodates the ball 37 may be employed. In this case also, the reinforcement tube 12 may be disposed at the position at which the reinforcement tube 12 covers the area surrounding the reinforcement coil 23 in the spaces in the ball 37 and the socket 35.

In this embodiment, the rotational-force transmission coil 33 is disposed between the flexible portion 11*a* and the flexible-portion cover member 13*a*. Although the rotational-force transmission coil 33 may be provided in each second lumen 21, as a result of disposing the rotational-force transmission coil 33 between the flexible portion 11*a* and the flexible-portion cover member 13*a*, it is possible to easily rotate the entire multi-lumen tube 11 about the longitudinal axis A.

In this embodiment, the second lumens 21 of the flexible portion 11*a* have spiral shapes. Alternatively, the second lumens 21 of the flexible portion 11*a* may be disposed so as to be, as with the second lumens 21 of the bending portion 11*b*, parallel to each other along the longitudinal direction at positions with equal spacings therebetween in the circumferential direction about the longitudinal axis A.

As has been described above, although an embodiment of the present invention has been described in detail with reference to the drawings, the specific configuration thereof is not limited to this embodiment, and design alterations within a range that do not depart from the scope of the present invention are also encompassed.

The following aspects can be also derived from the embodiments.

An aspect of the present invention is a medical manipulator including: an elongated flexible inserted portion; an end effector disposed at a distal end of the inserted portion; an operation portion that is disposed at a proximal end of the inserted portion and with which the end effector is operated; a first wire in which one end thereof is secured to the end effector and that transmits a motive force of the operation portion to the end effector; a long coil that is formed from a material having a greater rigidity than the inserted portion and in which one end thereof in a longitudinal direction is secured to the end effector and the other end thereof in the longitudinal direction is secured to the operation portion; and a reinforcement tube having a greater bending rigidity than the long coil, wherein the operation portion includes a first spherical housing that is connected to the inserted portion, a second spherical housing that is relatively rotatable with respect to the first spherical housing centered on a prescribed center point, and an end-effector operating member that is secured to the other end of the first wire and with which the first wire is pushed/pulled in the longitudinal direction, the long coil is disposed at a position at which the long coil covers an area surrounding the first wire, and the reinforcement tube is disposed at a position at which the reinforcement tube covers an area surrounding the long coil in spaces in the first spherical housing and the second spherical housing.

With this aspect, when the operation portion is operated, the end effector is actuated as a result of the motive force from the operation portion being transmitted to the end effector by the first wire.

In this case, by means of the long coil in which both ends thereof in the longitudinal direction are secured to the end effector and the operation portion, that is disposed at the position at which the long coil covers the area surrounding the first wire, and that is formed from a rigid material, it is possible to prevent an unintentional compressive deformation in the elongated flexible inserted portion.

In addition, in the case in which the first wire is pressed toward the distal end from the proximal-end side by the end-effector operating member, the reinforcement tube that is disposed at the position at which the reinforcement tube covers the area surrounding the long coil in the spaces in the first spherical housing and the second spherical housing and that has a high bending rigidity suppresses deformation due to bending of the first wire and the long coil. As a result, even in a case in which the first wire is pressed in a state in which the first wire and the long coil are bent as a result of the second spherical housing being relatively rotated with respect to the first spherical housing of the operation portion, it is possible to transmit the force from the operation portion to the end effector without causing attenuation thereof.

With the medical manipulator according to the above-described aspect, one end of the reinforcement tube in the longitudinal direction may be secured at a connecting position with respect to the inserted portion in the first spherical housing and the other end thereof in the longitudinal direction may be secured to the end-effector operating member.

With this configuration, it is possible to stabilize the position of the reinforcement tube in the spaces in the first spherical housing and the second spherical housing. Accordingly, it is also possible to stabilize the route of the first wire in which the surrounding area thereof is covered with the reinforcement tube.

With the medical manipulator according to the above-described aspect, the inserted portion may include an elongated long portion having flexibility and a bendable bending portion disposed at a distal end of the long portion, the medical manipulator may include a plurality of second wires in which one ends thereof are secured to the bending portion and that transmits the motive force of the operation portion to the bending portion, the reinforcement tube may include a plurality of tube inner holes into which the second wires are inserted and that have openings in an outer surface thereof at intermediate positions in the longitudinal direction, and the respective second wires may pass through the respective tube inner holes of the reinforcement tube from the long-portion side to be inserted into the first spherical housing, may protrude outside the reinforcement tube from the respective openings in the outer surface, and may be secured, at the respective other ends thereof in the longitudinal direction, to the second spherical housing.

The bending portion is bent with respect to the long portion as a result of the motive force from the operation portion being transmitted to the bending portion by the plurality of second wires.

In this case, as a result of the plurality of second wires being secured to the second spherical housing in the state in which the second wires pass through the tube inner holes of the reinforcement tube from the long-portion side and protrude from the respective openings in the outer surface, it is possible to guide the plurality of second wires with a single reinforcement tube. Accordingly, as compared with the case in which the respective second wires are guided by separate guide members, it is possible to achieve a reduction in the diameter of the medical manipulator.

With the medical manipulator according to the above-described aspect, the first spherical housing may include a guide portion that guides, in a direction along the longitudinal direction of the reinforcement tube, the second wires protruding outside the reinforcement tube from the openings and the guide portion may be disposed closer to the second spherical housing than the openings.

With this configuration, when the second wires are pulled, due to the guide portion, a large tensile force acts on the respective second wires protruding from the openings in the outer surface of the reinforcement tube in a direction along the longitudinal direction of the reinforcement tube. Therefore, as compared with a case in which a large tensile force acts on the respective second wires protruding from the openings in the outer surface of the reinforcement tube in a direction intersecting the longitudinal direction of the reinforcement tube, it is possible to reduce friction due to contact between edges of the openings in the outer surface and the second wires and it is possible to suppress damage to the second wires.

With the medical manipulator according to the above-described aspect, the bending portion and the long portion may be multi-lumen tubes having a plurality of lumens through which the plurality of second wires pass in a longitudinal axis direction, and the plurality of lumens passing through the long portion may be formed in spiral shapes about the longitudinal axis of the long portion.

As a result of the long portion, having flexibility, bending in accordance with a shape inside a lumen of a living body into which the multi-lumen tube is inserted, the shapes of the plurality of lumens of the long portion also change together with the bending of the long portion. As a result of the respective lumens of the long portion having the spiral shapes about the longitudinal axis of the long portion, the contact states between inner surfaces of the respective lumens and the respective second wires inside the respective lumens do not change greatly depending on the bent state of the long portion, and it is possible to suppress the occurrences of route differences among the respective second wires. Accordingly, it is not necessary to make motive forces from the operation portion greatly differ among the second wires in accordance with the bent state of the long portion. Therefore, it is possible to enhance the maneuverability and the controllability of the bending portion.

With the medical manipulator according to the above-described aspect, the long portion may be connected to the end-effector operating member via the spaces in the first spherical housing and the second spherical housing, and a portion of the long portion may constitute the reinforcement tube.

With the medical manipulator according to the above-described aspect, the first spherical housing may include a tubular tube support portion that supports the reinforcement tube, the tube support portion may have a support portion inner hole into which the reinforcement tube is inserted, a bonding hole that passes therethrough in a radial direction via the support portion inner hole, and a bonding clearance portion that passes therethrough in the radial direction via the support portion inner hole, the bonding clearance portion may be disposed between the bonding hole and the openings of the reinforcement tube, and the reinforcement tube may be secured to the support portion inner hole by means of an adhesive flowing thereinto from the bonding hole.

As a result of the reinforcement tube being secured to the support portion inner hole of the tube support portion by being bonded thereto, the reinforcement tube is supported. In this case, the adhesive that flows in from the bonding hole flows into the bonding clearance portion via the support portion inner hole. Accordingly, it is possible to divide the flow of the adhesive flowing toward the opening of the reinforcement tube and it is possible to prevent the adhesive from flowing into the opening of the reinforcement tube. Therefore, it is possible to prevent the reinforcement tube from being secured to the support portion inner hole by being bonded thereto together with the second wires protruding from the openings in the reinforcement tube, and it is possible to ensure sufficient sliding properties in the second wires.

REFERENCE SIGNS LIST 1 medical manipulator
3 flexible shaft (inserted portion)
5 operating unit (operation portion)
7 driving wire (first wire)
9 bending wire (second wire)
11 multi-lumen tube
11a flexible portion (long portion)
11b bending portion
12 reinforcement tube
12a slit (opening)
15 distal-end portion (movable portion)
16 gripping forceps (end effector)
19 first lumen (lumen)
21 second lumen (lumen, tube inner hole)
23 reinforcement coil (long coil)

27 operation handle (end-effector operating member)
35 socket (first spherical housing)
36 connection sleeve (tube support portion)
36a sleeve inner hole (support portion inner hole)
36b bonding hole
36c bonding clearance portion
37 ball (second spherical housing)
38b guide portion

The invention claimed is:

1. A medical manipulator comprising:
an elongated flexible inserted portion;
an end effector disposed at a distal end of the inserted portion;
an operation portion that is disposed at a proximal end of the inserted portion and with which the end effector is operated;
a first wire in which one end thereof is secured to the end effector and that transmits a motive force of the operation portion to the end effector;
a long coil that is formed from a material having a greater rigidity than the inserted portion and in which one end thereof in a longitudinal direction is secured to the end effector and the other end thereof in the longitudinal direction is secured to the operation portion; and
a reinforcement tube having a greater bending rigidity than the long coil,
wherein the operation portion includes a first spherical housing that is connected to the inserted portion, a second spherical housing that is relatively rotatable with respect to the first spherical housing centered on a prescribed center point, and an end-effector operating member that is secured to the other end of the first wire and with which the first wire is pushed/pulled in the longitudinal direction,
the long coil is disposed at a position at which the long coil covers an area surrounding the first wire,
the reinforcement tube is disposed at a position at which the reinforcement tube covers an area surrounding the long coil in spaces in the first spherical housing and the second spherical housing,
the first spherical housing includes a tubular tube support portion that supports the reinforcement tube,
the tube support portion has a support portion inner hole into which the reinforcement tube is inserted, a bonding hole that passes therethrough in a radial direction via the support portion inner hole, and a bonding clearance portion that passes therethrough in the radial direction via the support portion inner hole,
the bonding clearance portion is disposed between the bonding hole and openings of the reinforcement tube, the openings being located in an outer surface of the reinforcement tube at intermediate positions in the longitudinal direction, and
the reinforcement tube is secured to the support portion inner hole by an adhesive configured to flow thereinto from the bonding hole.

2. The medical manipulator according to claim 1, wherein one end of the reinforcement tube in the longitudinal direction is secured at a connecting position with respect to the inserted portion in the first spherical housing and the other end thereof in the longitudinal direction is secured to the end-effector operating member.

3. The medical manipulator according to claim 1, wherein
the inserted portion includes an elongated long portion having flexibility and a bendable bending portion disposed at a distal end of the long portion,
the medical manipulator comprises a plurality of second wires in which one ends thereof are secured to the bending portion and that transmit the motive force of the operation portion to the bending portion,
the reinforcement tube includes a plurality of tube inner holes into which the second wires are inserted and that have the openings, and
the respective second wires pass through the respective tube inner holes of the reinforcement tube from the long-portion side to be inserted into the first spherical housing, protrude outside the reinforcement tube from the respective openings in the outer surface, and are secured, at the respective other ends thereof in the longitudinal direction, to the second spherical housing.

4. The medical manipulator according to claim 3, wherein
the first spherical housing includes a guide portion that guides, in a direction along the longitudinal direction of the reinforcement tube, the second wires protruding outside the reinforcement tube from the openings and
the guide portion is disposed closer to the second spherical housing than the openings.

5. The medical manipulator according to claim 3, wherein the bending portion and the long portion are multi-lumen tubes having a plurality of lumens through which the plurality of second wires pass in a longitudinal axis direction of the inserted portion, and
the plurality of lumens passing through the long portion are formed in spiral shapes about a longitudinal axis of the long portion.

6. The medical manipulator according to claim 3, wherein
the long portion is connected to the end-effector operating member via the spaces in the first spherical housing and the second spherical housing, and
a portion of the long portion constitutes the reinforcement tube.

* * * * *